Patented July 18, 1933

1,918,477

UNITED STATES PATENT OFFICE

HERMANN LANG, OF PIESTERITZ BEZ. HALLE-ON-THE-SAALE, AND WILHELM MÜLLER, OF WITTENBERG, GERMANY, ASSIGNORS TO I. G. FARBENINDUSTRIE AKTIENGESELLSCHAFT, OF FRANKFORT-ON-THE-MAIN, GERMANY

PURIFICATION OF ELECTROLYTES

No Drawing. Application filed June 27, 1930, Serial No. 464,424, and in Germany June 28, 1929.

The present invention relates to improvements in the elimination of contaminating substances from electrolytes by means of an electrolytic treatment and is more especially concerned with the separation of such contaminations which are present in the electrolyte either in an ionized form or are incidentally converted into such form under the influence of the electric current.

When carrying out electrolytic purification of electrolytes in the usual manner, namely by subjecting an impure electrolyte between an anode and a cathode of usual shape and form to the action of a current, it is well known that the current yield, and also the energy yield relative to the contaminating substance are both rapidly diminished below a certain limit of its concentration in the solution. It is therefore generally considered inadvisable to pursue the electrolytic purifying treatment beyond a certain limit of concentration, as the process under the conditions resulting therefrom can no longer be effected in an economical manner.

The main object of the present invention therefore is to provide a method for improving the current as well as the energy yield of electrolytic purification in cases when the contaminations are present in the electrolyte only in exceedingly small concentrations, ranging from about one tenth of one percent down to mere traces. The invention aims to render the usual process economical even in extreme cases by suitably adjusting the working conditions of the process. The method according to the present invention is equally applicable to the purifying treatment of saline as well as caustic or acid solutions containing either small amounts of contaminating heavy metal salts or compounds which under the direct or indirect action of the current are reduced to the metallic state, and also contemplates the conversion of contaminating compounds into a state of higher or lower valency.

According to the present invention the electrolyte containing the contaminations is caused to flow not along, but through the electrode or electrodes effecting the deposition or conversion of the contamination, said "active" electrode or electrodes for this purpose being provided with extremely narrow passages which are permeable to the liquid. The width of these passages is so selected as to stand in a ratio to the concentration of the impurities to be removed from the electrolyte, that means the lower concentration of the latter, the smaller the width of the passages. In order to attain this purpose the active electrode or electrodes are preferably made of an extremely dense wire netting, having a mesh density of at least about 100 per square centimetre, multiple wire nettings (called "Tresse" in the German and French languages) being especially suitable. The speed of the flowing electrolyte is also extremely small and advantageously only amounts to a few centimetres per hour.

As to the current density imposed upon the active electrode, it is advantageous to adjust the same to the low concentration of the impurities to be removed from the electrolyte.

The current densities required for the purpose are, in any case, considerably below the densities generally usual for performing electrolysis on a technical scale, said processes making use, as a rule, of as high densities as possible for the purpose of decomposing the electrolyte (as for instance brines, acidulated water, solutions of salts of heavy metals etc.). If, as is generally the case, only one of the two electrodes is employed as the active one, the other electrode which is not expected to partake in the purification may be loaded with any ordinary current density.

The following examples show various particular modes of application of the present invention.

(1) *Elimination of arsenic from phosphoric acid*

Phosphoric acid having a $H_3PO_4$ content of 80 to 90 percent and containing, besides traces of heavy metal salts, about 20 milligrams of $As_2O_3$ per litre, is passed at a speed of about 4 centimetres per hour through a trough-shaped oblong container of suitable material, in which is spanned a number of copper wire nettings extending over the whole cross-section of the trough, the fabric of said nettings being densely meshed (for instance, 450 meshes per square centimetre, diameter of the warp-wires 0,17 millimetres, diameter of the weft-wires 0,25 millimetres). Between each pair of the nettings switched in parallel, one or more platinum wires serving as anodes are suspended in the electrolyte and a direct current of low voltage, say about 2 or 3 volts, is passed through the bath. On the anodes which are charged with about 0,1 ampere per square centimetre, a moderate discharge of oxygen takes place owing to the decomposition of water. On the cathode wire nettings which are loaded with a current density amounting to only about one hundredth to one thousandth of that on the anodes, a discharge of the heavy metal ions takes place and, simultaneously, the arsenous acid is reduced to elementary arsenic, the metals and the arsenic being precipitated in a loose metallic state on the cathode and being swept along by the phosphoric acid in form of an extremely fine suspension. After having passed the cathode wire nettings in series, the precipitates are removed by filtration from the acid, which now represents a perfectly clear pure liquid entirely free from foreign metals and from arsenic.

The following tables show the economy of the process according to the invention with regard to the current yield as compared with similar purification processes in which the electrolyte is not caused to pass the electrode. (See tables 1 and 2.) The figures in the first column of these tables refer to amperes per square centimetre of the entire cathode surface (not considering the aperture of the meshes).

It convincingly appears from these figures that the current consumption per kg $P_2O_5$ when working according to the invention is at least ten times smaller and further that the influence of a reduction of the current density on the cathodes is more pronounced, than in processes desisting from passing the electrolyte through the electrode. In fact, the current consumption in the present case closely approaches the theoretical, as will appear from the course of the respective figures in correlation to the current density. Probably this favourable result is also due to the fact that the meshes of the wire netting are still somewhat narrowed by a temporary fixation of some of the arsenic precipitated during electrolysis.

In a similar manner, also other electrolytes containing small amounts of substances which are either electrolytically separable or may at least be influenced electrolytically, may be purified. Thus it has appeared from experiments that the oxidation of small quantities of $H_3PO_3$ and $H_3PO_2$ such as frequently occur in phosphoric acid produced by various methods, takes place with a considerably improved current yield (6 to 10 times better), when the solution is passed through extremely finely meshed anode wire nettings (5,000 meshes per square centimetre) instead of coarser nettings (100 meshes per square centimetre), the current density, which is kept small, in both cases remaining constant. It thus appears that in the process according to the invention, also both the anode and the cathode may serve as active electrodes, either simultaneously or or consecutively.

(2) *Elimination of arsenic from sulphuric acid*

Sulphuric acid of 1,68 sp. gr. containing 1,47 grs. of arsenic per kg was passed through a platinum wire netting of 10,000 meshes per square centimetre serving as a cathode and through perforated lead sheets serving as anodes at a speed of 1.4 centimetre per hour. The current density at the cathode amounted at 0,0002 ampere per square centimetre. After consumption of 2,6 ampere hours per kg of sulphuric acid, the acid was free from arsenic. The current yield amounted to about 61 percent.

Table 1.—*Purification of phosphoric acid (65 percent $P_2O_5$) containing 0.023 percent of arsenic*

| Current load amps. per sq. cent. | Electrolyte is passed through wire netting cathodes according to invention | | Electrolyte is passed along wire netting cathodes | | Electrolyte is passed along sheet cathodes | | Electrolyte vividly stirred by rotating wire netting cathode | |
|---|---|---|---|---|---|---|---|---|
| | Current yield percent | Kwhs per kg $P_2O_5$ | Current yield percent | Kwhs per kg $P_2O_5$ | Current yield percent | Kwhs per kg $P_2O_5$ | Current yield percent | Kwhs per kg $P_2O_5$ |
| 0,00014 | 43 | 0.003 | 4.3 | 0.03 | 3.6 | 0.036 | 4 | 0.03 |
| 0,0014 | 21 | 0.006 | 2.5 | 0.05 | | | | |
| 0,0028 | | | 1.7 | 0.08 | | | | |
| 0,007 | 6.6 | 0.02 | 0.9 | 0.17 | 0.7 | 0.2 | 0.83 | 0.18 |
| 0.014 | 3.5 | 0.043 | 0.5 | 0.28 | 0.4 | 0.34 | 0.5 | 0.30 |

Table 2.—*Purification of phosphoric acid (65 per cent $P_2O_5$) containing 0.001 per cent of arsenic*

| Current load amps. per sq. cent. | Electrolyte is passed through wire netting cathodes according to invention | | Electrolyte is passed along wire netting cathodes | | Electrolyte is passed along sheet cathodes | | Electrolyte vividly stirred by rotating wire netting cathode | |
|---|---|---|---|---|---|---|---|---|
| | Current yield percent | Kwhs per kg $P_2O_5$ | Current yield percent | Kwhs per kg $P_2O_5$ | Current yield percent | Kwhs per kg $P_2O_5$ | Current yield percent | Kwhs per kg $P_2O_5$ |
| 0.00014 | 2.2 | 0.003 | 0.22 | 0.03 | 0.18 | 0.036 | 0.2 | 0.03 |
| 0.0014 | 1.1 | 0.006 | 0.13 | 0.05 | | | | |
| 0.0028 | | | 0.09 | 0.08 | | | | |
| 0.007 | 0.3 | 0.02 | 0.046 | 0.168 | 0.40 | 0.2 | 0.04 | 0.18 |
| 0.014 | 0.2 | 0.043 | 0.03 | 0.480 | 0.02 | 0.34 | 0.03 | 0.30 |

When on the other hand, the acid, instead of being passed through the electrodes, is subjected to electrolysis while remaining stationary, the current consumption required to attain the same stage of purification amounts to 5.43 ampere hours for every one kilogram of sulphuric acid, this corresponding to a current yield of only 28 percent.

*(3) Elimination of arsenic acid from acetic acid*

Acetic acid (50%) containing 0.01 gr $As_2O_3$ per kg was passed through a platinum wire netting of about 10,000 meshes per square centimetre serving as a cathode with a speed of about 1 centimetre per hour. The anode consisted of platinum wires suspended in the electrolyte. The cathodic current density amounted to 0.0001 ampere per square centimetre. After consumption of one ampere hour per kg the acid was found to be free from arsenic. The current yield amounted to 1 percent.

When the test was carried out by passing the acetic acid along instead of through the cathode, all the other conditions remaining unaltered, 8 ampere hours were required to attain the same degree of purity, the current yield thus corresponding to only 0.12 percent.

*(4) Elimination of mercury from acetic acid*

Acetic acid (50%) containing 0.01 gr of mercury per kg was passed through a platinum wire netting of 10,00 meshes per square centimetre serving as a cathode, with a speed of 1.3 centimetres per hour, platinum wires suspended in the electrolyte serving as anodes. The cathodic current density amounted to 0.0001 ampere per square centimetre. After consumption of 0.24 ampere hour per kg of acetic acid, the acid was free from mercury, this corresponding to a current yield of about 1.1 percent.

When the acid is simply passed along instead of through the cathode netting, all of the other conditions remaining the same, the complete elimination of the mercury can only be effected with a current yield of about 0.15 percent.

It appears from the Examples 2 to 4 that even with comparatively low current yields the method according to the present invention still compares favourably with the purifying methods formerly employed.

The process as described is also applicable to the purification of other electrolytes as long as the latter, under the current densities required for the elimination of the impurities, do not themselves undergo an alteration. Thus for example it is possible to eliminate small quantities of lead from nitric acid or nitrate solutions, if desired also as superoxide of lead on the anode.

We claim:

1. In a process for purifying by electrolysis an electrolyte from impurities dissolved therein, the steps which comprise passing said impure electrolyte through a meshed wire cathode and charging said cathode with a current density of at most one hundredth of the anodic current density.

2. In a process for purifying by electrolysis an electrolyte from impurities dissolved therein, the steps which comprise passing said impure electrolyte through a meshed wire cathode with a speed of at most a few centimetres per hour and charging said cathode with a current density of at most one hundredth of the anodic current density.

3. In a process for purifying phosphoric acid from impurities dissolved therein, the steps which comprise passing the raw phosphoric acid successively through a series of meshed wire cathodes and charging said cathode with a current density of at most one hundredth of the anodic current density.

4. In a process for purifying phosphoric acid from impurities dissolved therein, the steps which comprise passing the raw phosphoric acid successively through a series of meshed wire cathodes with a speed of at most a few centimetres per hour, and charging said cathode with a current density of at most one hundredth of the anodic current density.

5. In a process for purifying acetic acid from impurities dissolved therein, the steps which comprise passing the raw acetic acid successively through a series of meshed wire cathodes and charging said cathode with a current density of at most one hundredth of the anodic current density.

WILHELM MÜLLER.
HERMANN LANG.